United States Patent
Ehrlich et al.

(10) Patent No.: US 6,546,427 B1
(45) Date of Patent: Apr. 8, 2003

(54) STREAMING MULTIMEDIA NETWORK WITH AUTOMATICALLY SWITCHABLE CONTENT SOURCES

(75) Inventors: Marni S. Ehrlich, Hackettstown, NJ (US); Neil A. Katz, Parkland, FL (US); Leonardo C. Massarini, Westport, CT (US); Lawrence P. O'Connell, Matawan, NJ (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/335,717

(22) Filed: Jun. 18, 1999

(51) Int. Cl.[7] ............................................... G06F 15/16
(52) U.S. Cl. ...................... 709/231; 709/238; 709/239; 709/245; 370/299
(58) Field of Search ........................ 709/231, 217–219; 340/825, 531; 370/299, 278, 282; 359/125; 455/3.03, 3.04, 3.06, 78

(56) References Cited

U.S. PATENT DOCUMENTS

| | | | |
|---|---|---|---|
| 4,720,873 A | * 1/1988 | Goodman et al. | 725/32 |
| 4,965,825 A | * 10/1990 | Harvey et al. | 380/233 |
| 5,200,825 A | 4/1993 | Perine | 348/722 |
| 5,262,875 A | 11/1993 | Mincer et al. | |
| 5,629,867 A | * 5/1997 | Goldman | 709/217 |
| 5,768,527 A | 6/1998 | Zhu et al. | |
| 5,793,980 A | 8/1998 | Glaser et al. | |
| 5,809,246 A | * 9/1998 | Goldman | 709/217 |
| 5,828,839 A | 10/1998 | Moncreiff | |
| 5,859,600 A | * 1/1999 | Perkins et al. | 725/32 |
| 5,905,865 A | 5/1999 | Palmer et al. | |
| 5,961,603 A | * 10/1999 | Kundel et al. | 709/229 |
| 6,199,076 B1 | * 3/2001 | Logan et al. | 707/501 |

OTHER PUBLICATIONS

Program Insertion in Real–Time IP Multicasts, Brassil, J.; Garg, R.; Schulzrinne, H., ACM: Computer–Comm.–Review, vol. 29, No. 2, ISSN: 0146–4833, Apr. 1999, pp. 49–68.*

* cited by examiner

Primary Examiner—Mark H. Rinehart
Assistant Examiner—Beatriz Prieto
(74) Attorney, Agent, or Firm—Joseph C. Redmond, Jr.; Morgan & Finnegan, LLP

(57) ABSTRACT

A streaming multimedia communication network includes a broadcaster providing program content by air wave or direct line to a network service provider, e.g. an Internet Radio Service provider (IRSP) which operates a web site for distribution of the content to remote end users over the network. The IRSP reformats the broadcast content into industry-standard streaming format, such as Real Audio. End users are coupled to the IRSP through a local network service provider, e.g. an Internet Service provider (ISP). An alternate content source is connected by airwaves or direct line to the ISP. The end user accesses the IRSP web site to select and receive program content over the network from a remote broadcaster listed on the site. The ISP transparently switches the network content at predefined intervals and substitute alternative content for the selected content during the predetermined interval for delivery of the alternative content to the end user.

22 Claims, 4 Drawing Sheets

STREAMING MULTIMEDIA NETWORK WITH AUTOMATICALLY SWITCHABLE CONTENT SOURCES

BACKGROUND OF INVENTION

1. Field of Invention

This invention relates to multimedia communications systems and methods of operation. More particularly, the invention relates to streaming multimedia communications systems and methods of operation with automatically switchable content sources.

2. Background Discussion

Real-time streaming of multimedia files stored in a remote server and transmitted to an end user over a packet network; e.g., the Internet is described in U.S. Pat. No. 5,768,527. A server for use in such streaming multimedia systems is described in U.S. Pat. No. 5,262,875. The server stores the streaming files as compressed digital audio/video program information. An audio-on-demand communication system which provides real time playback of audio data transferred by a communications network is described in U.S. Pat. No. 5,793,980. At the request of the user, a server transmits the compressed audio data over the network to the end user. The end user receives and decompresses the transmitted audio data in less than real time using only the processing power of a CPU. The streaming digitized audio information is provided to the end user through a streaming protocol such as "Real-Audio", available from real-audio player, Real Networks, Inc., Seattle, Wash.

In today's streaming solution, such as Internet radio, a local broadcaster would have a connection to the Internet. An Internet Radio Service Provider (IRSP), such as the Web Site Broadcast.Com would make the local broadcasters content available to end-users over the Internet. An end user would connect to the Internet through a proxy server. When the end user wanted to listen to a particular radio station, typically remote to the end user, the end user would connect to the station's broadcast content, hosted by the IRSP through the local Internet Service Provider's (ISP) proxy. The end user would receive not only the radio broadcast but also the remote station's radio commercials. These commercials, since they were created for broadcast listeners of the remote radio station, would have little to no relevance or possible brand creation awareness to the Internet radio listener. What is needed in the art is the ability of a local ISP to switch or substitute for the remote station's commercials an alternate commercial stream of messages that would have relevance to the end user and any Internet radio subscriber. Such alternate messages could be presented based upon local information of the Internet subscriber. For example, an Internet radio listener in Australia would receive local commercials in Australia instead of hearing commercials from an U.S.-based radio station. Such alternate messaging service creates revenue opportunities for local service providers, and potentially licensing revenue for the source station.

SUMMARY OF THE INVENTION

An object of the invention is a streaming multimedia communications system and method operation which enables an ISP to substitute alternate program content to an end user within an existing IRSP program.

Another object is a streaming multimedia communications system and method operation enabling an ISP to automatically switch to an alternate content provider within an existing IRSP program and then return to the original IRSP content if required.

Another object is a streaming multimedia network and method operation enabling an ISP to transparently switch network addresses to allow content to stream from an alternate content provider to an end user in place of the network content.

Another object is a streaming multimedia network and method operation of generating synchronization signals for transparently switching an end user to alternate content within the network content.

Another object is a streaming multimedia network and method operation authenticating a notification to a network service provider and a local service provider of substituted program content to an end user for billing purposes.

These and other objects, features and advantages are achieved in a streaming multimedia communication network including a broadcaster providing program content by air wave or direct line to a network service provider, e.g. an Internet Radio Service provider (IRSP) operating a web site on the network for distribution of the content to remote end users over the network. The IRSP reformats the broadcast content into industry-standard streaming format, such as Real Audio. The end users are coupled to the IRSP through a local network service provider, e.g. an Internet Service provider (ISP) proxy. An alternate content source is connected by airwaves or direct line to the ISP. The end user accesses the IRSP web site to select and receive program content over the network from a remote broadcaster listed on the site. There are several embodiments for handling remote broadcaster transitions to a commercial within the program content delivered over the network to the end user. In one embodiment, the IRSP is notified of a commercial by the remote broadcaster either by a direct connection or sending a message through the network to the web terminal. The message to the IRSP may indicate whether the upcoming commercial is 15, 30, 45 seconds, or 1 minute long. The IRSP relays the notification to the ISP proxy. The proxy transparently switches the network address for the end user to the network address of an alternate content source. The end user now receives content in the form of local commercials from the alternate content provider rather from the local broadcaster. When the network commercial ends, the remote broadcaster notifies the IRSP the commercial is ended if a commercial time period was not included in the commercial notification. The IRSP, in turn, notifies the ISP proxy which transparently switches the end user network address back to the program content provided by the remote broadcaster. The alternate program content is terminated by the ISP. In another embodiment, a pause is inserted in the broadcast. The pause notifies the downstream broadcasters to insert a local commercial. The pause is long enough to allow for delays on either end of the originating commercial to assure that the inserted commercial does not overlap the broadcast when returning. The IRSP/ISP notifications to switch content may be authenticated, secure and password protected. The secure notifications are available for billing the alternate content provider and providing licensing revenue to the remote broadcaster.

DESCRIPTION OF DRAWING

The invention will be further understood from the following detailed description of a preferred embodiment, taking in conjunction with an appended drawing, in which.

DESCRIPTION OF A PREFERRED EMBODIMENT

Figure 1:
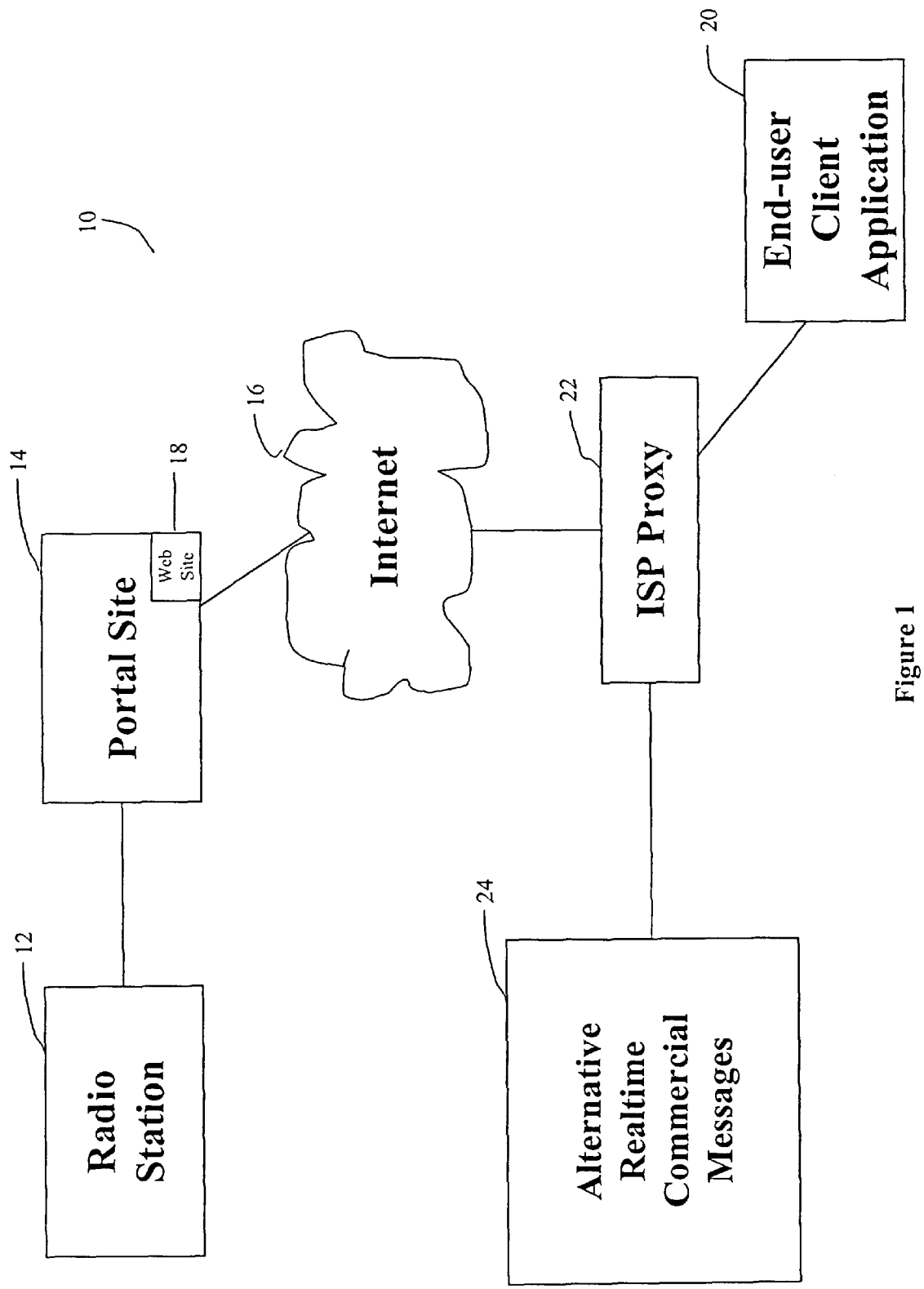
FIG. 1 is a representation of a streaming multimedia network for providing end users alternate program content within network content and incorporating the principles of the present invention.

In FIG. 1, a streaming multimedia network 10 includes a radio broadcasting station 12, which generates program content in audio form and transmits the content by airwaves or by a direct connection, e.g., telephone line to an Internet Radio Service provider (IRSP) 14 for re-transmission over a network 16, e.g. the Internet. The IRSP operates a Web Site 18 at an Internet address, e.g. HTTP:\\www.broadcast.com. on the network 16. The Web Site displays a home page (not shown) which lists program content for re-transmission from various radio stations transmitting directly or indirectly to the IRSP. The content is selectable by an end user 20 coupled to the Internet through a local Internet Service Provider (ISP) server proxy 22, after accessing the Web Site. The proxy can operate in several relationships with the IRSP 14. In one relationship, the proxy acts as a client to the provider 14 and looks like a client. In another relationship, the proxy 22 operates at a lower level of the network transmission protocol where it modifies the streaming header information while still maintaining the packet sequence to the end user client application. The proxy is coupled by wire or air wave to an alternative content provider 24, which when directed by the proxy, provides local content, typically commercials in place of commercials in the content selected by the end user. Typically, the alternate content provider serves the geographic area in which the end user is located. In one embodiment, the station 12 signals the IRSP the time and duration when a commercial will be included in the content. Generally, the commercial is only pertinent to the listeners served by the station, and not pertinent to remote end users receiving the content. During such time and duration, the proxy switches the end user network address from the IRSP to the alternate content provider Internet address which transmits the local content, typically commercials pertinent to the end user. At the end of the time period, the ISP proxy transparently switches the end user to the remote station.

Figure 2:
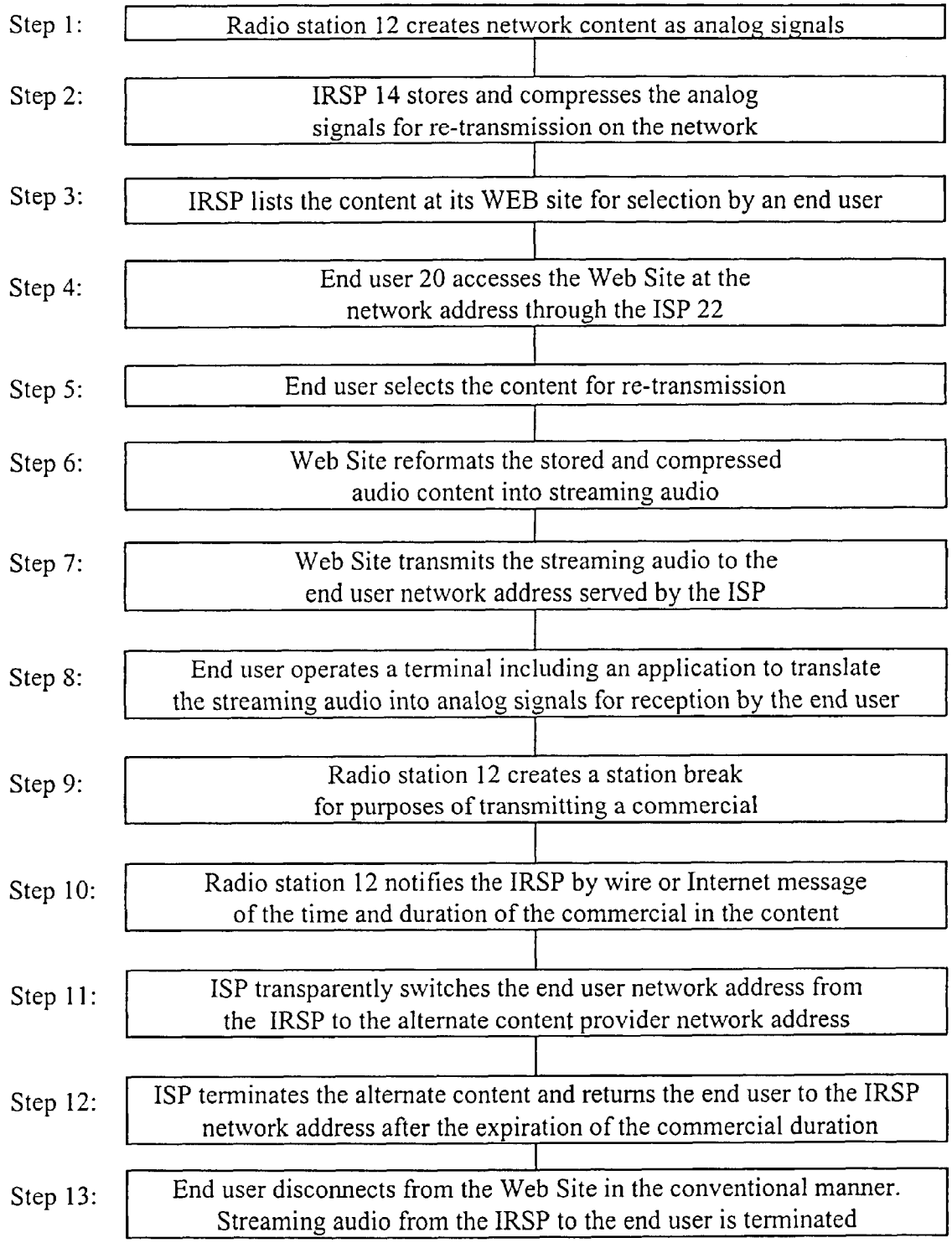
FIG. 2 is a flow diagram providing an end user alternate content in FIG. 1.

In FIG. 2, the process of an end user connecting to the web site to select and receiving content will now be described.

In step 1, the radio station 12 creates content for distribution on the Internet. The content is provided to the IRSP 14 by a direct telephone connection or by airwave.

In step 2, the IRSP 14 stores and compresses the analog signal from the radio station for re-transmission on the network.

In step 3, the IRSP lists the content at its Web Site for selection by an end user at the IRSP network address. Typically, the web page contains a list of other radio stations from which content is available for re-transmission to remote end users out of the geographic area of the content provider.

In step 4, the end user 20 accesses the Web Site at the network address through the ISP 22.

In step 5, after access to the Web site, the end user selects the content for retransmission.

In step 6, the Web Site reformats the stored and compressed audio content into streaming audio using a software program such as, "Real Audio".

In step 7, the Web Site transmits the streaming audio containing remote station program content to the end user network address served by the ISP.

In step 8, the end user operates a terminal including an application to translate the streaming audio into analog signals for reception by the end user.

In step 9, the radio station 12 creates a station break for purposes of transmitting a commercial in place of the content transmitted to the end user. The commercials are intended to appeal to listeners in the radio station geographical area and may have no relevance or possible brand creation awareness to the remote end user.

In step 10, the radio station 12 notifies the IRSP by wire or Internet message as a signal of the time and duration of a pause to go to a commercial in the transmitted content. The signal to go to commercial contains the address of the particular pause. The ISP Proxy identifies the unique addressable pause to go to commercial for the time period. There are other known techniques used in today's broadcast industry regarding when to go to commercial and when not. These known techniques can be used in addition to using the previously described signaling technique.

In step 11, after determining that a switch to commercial has occurred (either through signaling or known techniques) the ISP transparently switches the end user network address from the IRSP to the alternate content provider network address to switch in alternate content, typically a commercial of relevance to the end user for the time and duration of the commercial in the network content. In such an arrangement, the ISP can collect local advertising revenues for the switched-in commercial and in turn, the IRSP can collect licensing revenue from the ISP for including the alternate content in the network content.

In step 12, after the expiration of the commercial duration, the ISP terminates the alternate content and returns the end user to the IRSP network address.

In step 13 the end user disconnects from the Web Site in the conventional manner whereupon the streaming audio from the IRSP to the end user is terminated.

Two techniques will now be described for the ISP in providing alternative real time commercial messages to the end user at the time and for the duration of commercial messages appearing in the content received by the end user from the radio station.

Figure 3:
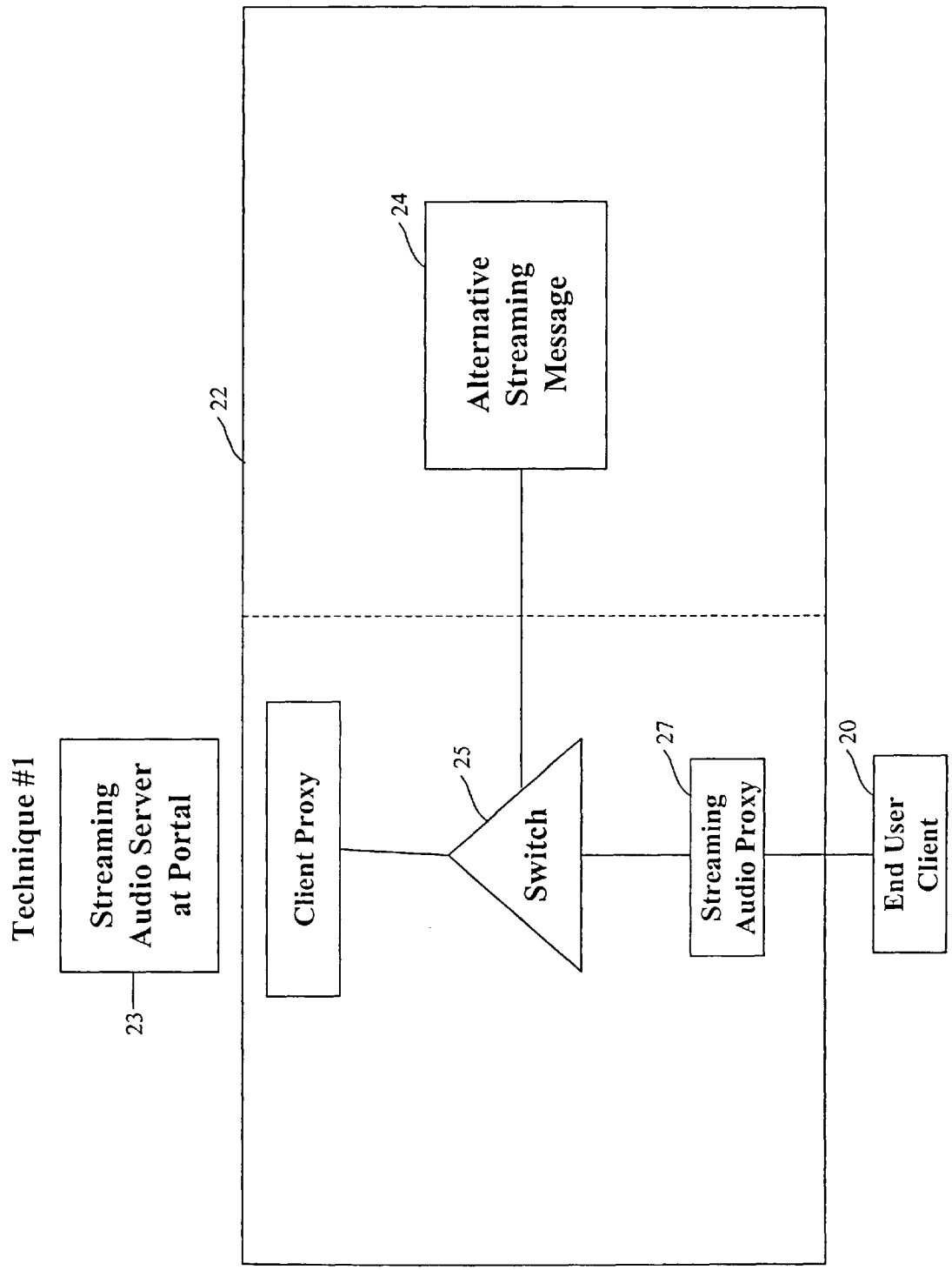
FIG. 3 is a representation of FIG. 1 using a first technique for providing an end user with alternate content.

In FIG. 3, the ISP 22 serves as a client proxy to a streaming audio server 23 at the IRSP 14. The server 23 receives the content from the radio station in analog form; compresses the analog content using a standard industry format, e.g. Real Audio and transmits the content over the network in packet form to the client proxy. A header is included in each packet. The header includes a sequence number such that a client application can use the sequence number to reassemble the packets into the transmitted streaming audio. The client application converts the streaming audio into digital audio for transmission to the end user.

A switch 25 in the client proxy includes circuitry for detecting a signal or message from the IRSP notifying the client application of a forthcoming commercial or the end of a commercial or the duration of forthcoming commercial. The signal or message may be encrypted by the IRSP and decrypted by the circuitry using standard techniques. The switch 25 automatically and transparently switches the end user to the network address of the alternate content provider 24 which provides a streaming audio commercial message to a streaming audio proxy 27. The streaming audio is reformatted as packetized digital audio and transmitted by the proxy 27 to the end user. In one embodiment, the streaming audio proxy 27 is a standard network server adapted to run Real Audio. A terminal operated by the end user includes standard applications, e.g. Real-Audio 2G for re-sequencing the streaming packets and converting the digital information into analog for reception by the end user.

When the network commercial ends, the switch 25 automatically disconnects the alternate content source from the proxy 27 and transfers transparently the end user to the network address of the IRSP which resumes re-transmission of the network content to the end user.

Figure 4:
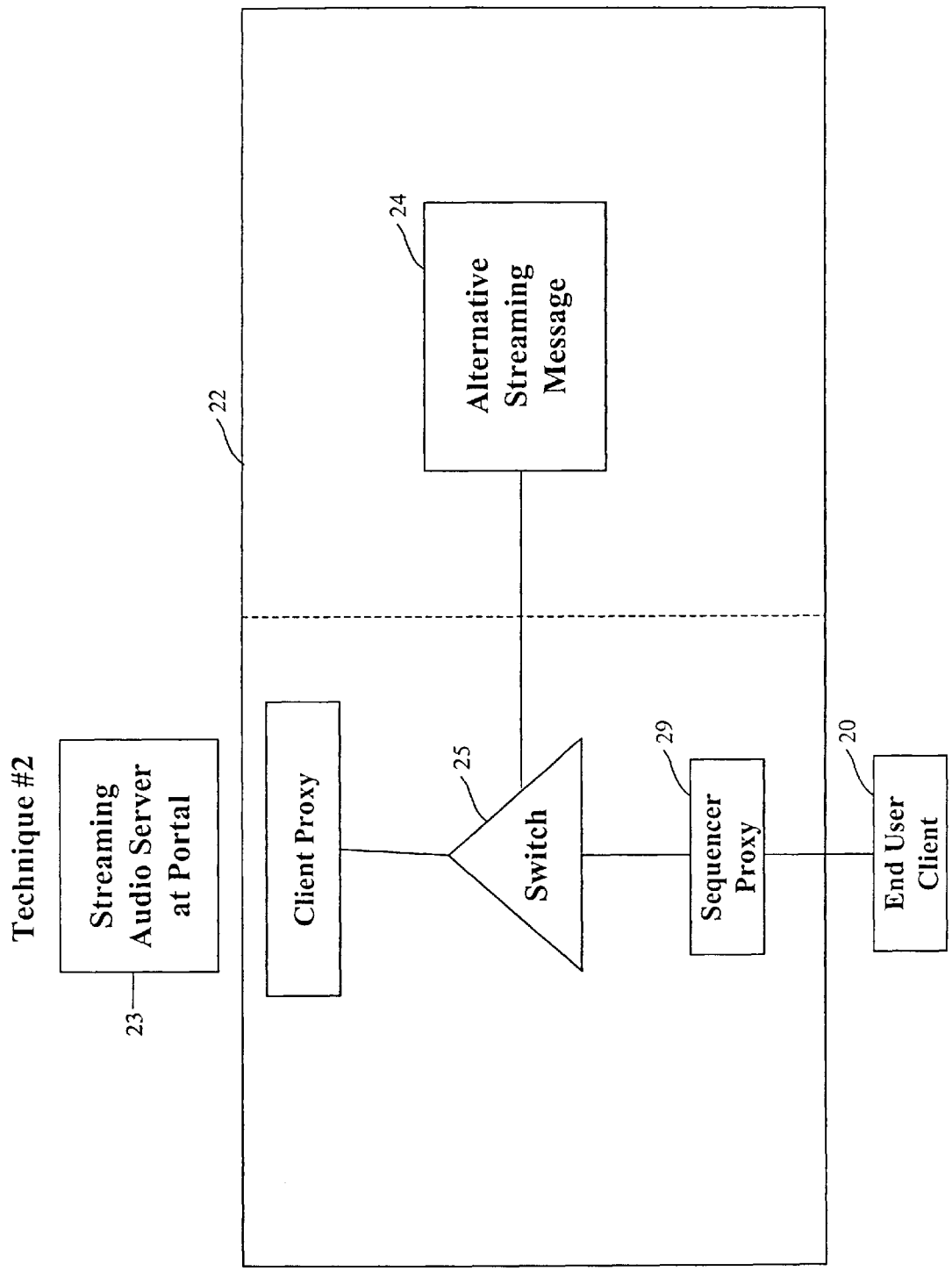
FIG. 4 is a representation of FIG. 1 using a second technique for providing an end user with alternate content.

In FIG. 4, a conventional sequencer proxy 29 is substituted in the ISP proxy 22 for the streaming audio server 27 of FIG. 3. The sequencer ensures there is no loss in sequence number as the alternate streaming message is substituted for the original streaming message. Without maintaining the sequence of streaming packets, the end-user client would see packets out of sequence, potentially detect an error, and then disconnect from the source. The ISP continues to operate as described for FIG. 3, except the sequencer 29 maintains the sequence of packets even though the alternative content source has been selected. As long as the sequence is maintained, the end user client will continue to receive and operate correctly. Again, the end user terminal is responsible for re-sequencing the packets and converting the digital information into the analog signals for reception by the end user.

In another embodiment, the IRSP message notifying a commercial break in the radio content may require password acknowledgement by the ISP to switch to the alternate content. By entering the password the ISP establishes the basis for billing the alternate content provider for the message delivered to the end user and payment of a licensing fee to the IRSP for the substitution of the local message in the network content.

While the invention has been shown and described in conjunction with a preferred embodiment, various changes can be made without departing from the spirit and scope of the invention, as defined in the appended claims, in which:

We claim:

1. A streaming multimedia communication network, comprising:
    an Internet Radio Source Provider (IRSP) transmitting media content in a broadcast signal;
    a network provider receiving and reformatting the media content for re-transmission on the network as transmitted content;
    a local provider coupled to the network and to an alternative content source;
    an end user coupled to the local provider and transmitting a request through the local provider to the network provider for retransmission of selected transmitted content to the end user; and
    means included in the local provider for transparently switching the end user network address from the IRSP to the alternate content provider network address to switch in the alternate content at predetermined intervals and substituting content of the alternative content source for the selected transmitted content during the predetermined interval for delivery of the alternate content to the end user, and thereafter returning to the selected transmitted content.

2. The network of claim 1 further comprising:
    means included in the network provider for compressing the broadcast signal and reformatting the broadcast signal as a streaming multimedia signal.

3. The network of claim 1 further comprising:
    means for transmitting a signal through the network to the local provider signaling the beginning and end of the predetermined interval.

4. The network of claim 1 further comprising:
    means for synchronizing the delivery of the alternative content in the predetermined interval with the selected transmitted content.

5. The network of claim 1 further comprising:
    means for formatting the alternate content in a streaming format.

6. The network of claim 1 further comprising:
    means for converting the streaming multimedia transmission into analog signals that represents a transmitted network media content.

7. The network of claim 1 further comprising:
    a network site associated with the network provider and accessible by the end-user for selecting transmitted content for retransmission to the end user.

8. The network of claim 1 further comprising:
    switching means included in the local provider for transparently switching the end user from the selected transmitted content to the alternate content source during the predetermined interval.

9. The network of claim 1 further comprising:
    means included in the local provider for maintaining a sequence of multimedia signals even though no alternate content has been selected.

10. The network of claim 1 wherein the streaming multimedia signal represents an audio signal.

11. The network of claim 1 wherein the information network is a distributed information network.

12. In a streaming multimedia communication network transmitting media content from a network provider, a method of replacing media content with alternative content at predetermined intervals, comprising the steps of:
    transmitting the media content in a broadcast signal by an Internet Radio Service Provider (IRSP);
    receiving the broadcast signal by a network provider in an information network;
    storing and reformatting the media content as a streaming multimedia signal for retransmission on a network as transmitted content; and
    requesting retransmission of the reformatted multimedia signal by an end user; and re-transmitting the re-formatted signal to the end user through a local provider coupled to an alternative content source and the network, the local provider switching the end user network address from the IRSP to the alternate content provider network address to switch in alternate content.

13. The method of claim 12 further comprising the steps of:
    substituting the alternative content for the media content requested by the end user during predetermined intervals occurring in the multimedia retransmitted signal, and thereafter returning to the media content.

14. The method of claim 12 further comprising the step of:
    signaling the local provider when a commercial will occur in the transmitted content.

15. The method of claim 12 further comprising the step of:
    transmitting the re-formatted multimedia signal in a sequence of packets.

16. The method of claim 12 further comprising the step of:

converting the multimedia signal into an analog signal for hearing by the end user at the terminal.

17. The method of claim 14 further comprising the step of:

authenticating the signaling to the local provider for billing the alternate content source.

18. The network of claim 1 further comprising:

notifying apparatus which notifies the local provider of the defined interval for switching to the alternate content and requiring a password acknowledgement by the local provider for billing purposes prior to the switching.

19. The network of claim 18 further comprising:

billing apparatus responsive to the password for billing the alternate content source for the alternate content delivered to the end user.

20. The network of claim 1 further comprising:

the network provider re-transmitting the as selected transmitted content in streaming packets; and sequencing apparatus sequencing the streaming packets and ensuring there is no loss in packet sequence numbers as the alternate content is substituted for the selected transmitted content.

21. The method of claim 12 further comprising the step of:

billing the alternate content source for the alternate content delivered to the end user.

22. The method of claim 12 further comprising step of:

sequencing the streaming packets and ensuring there is no loss in packet sequence numbers as the alternate content is substituted for the selected transmitted content.

* * * * *